(12) United States Patent
Kato (10) Patent No.: US 7,144,556 B2
(45) Date of Patent: Dec. 5, 2006

(54) METHOD AND APPARATUS FOR DECOMPOSITION OF SUBSTANCE CONTAINED IN GAS

(75) Inventor: Kinya Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 10/411,178

(22) Filed: Apr. 11, 2003

(65) Prior Publication Data

US 2003/0202921 A1    Oct. 30, 2003

(30) Foreign Application Priority Data

Apr. 25, 2002  (JP)  .............................. 2002/124133
Mar. 20, 2003  (JP)  .............................. 2003/077732

(51) Int. Cl.
*B01J 19/08*    (2006.01)

(52) U.S. Cl. ..................... 422/186.3; 422/180; 96/125
(58) Field of Classification Search ............. 422/186.3, 422/180; 96/125
See application file for complete search history.

(56) References Cited

U.S. PATENT DOCUMENTS 4,409,006 A * 10/1983 Mattia ......................... 95/113
6,238,628 B1   5/2001 Matsutani ................... 422/172
6,444,015 B1   9/2002 Kato ............................ 95/143
6,462,250 B1  10/2002 Kuriyama et al. .......... 588/204
6,805,845 B1 * 10/2004 Maekawa .................... 422/177
2002/0130030 A1  9/2002 Kato et al. ............. 204/157.15

FOREIGN PATENT DOCUMENTS

| JP | 62-163730 | 7/1987 |
| JP | 5-131113 | 5/1993 |
| JP | 7-155543 | 6/1995 |
| JP | 8-15529 | 2/1996 |
| JP | 2002-102651 | 4/2002 |

\* cited by examiner

*Primary Examiner*—Kishor Mayekar
(74) *Attorney, Agent, or Firm*—Fitzpatrick, Cella, Harper & Scinto (57) ABSTRACT

A decomposition apparatus and a decomposition method using the apparatus in which a substance to be decomposed is decomposed with high efficiency are disclosed. A decomposition apparatus includes condensation means for increasing the concentration of the substance, and decomposition means provided with a decomposition chamber (predetermined space) for receiving and decomposing the substance. The substance of which concentration is increased by the condensation means, in a gaseous state, is directly transported to the decomposition chamber and is decomposed.

10 Claims, 6 Drawing Sheets

◌ : POLLUTANT

FIG. 6

METHOD AND APPARATUS FOR DECOMPOSITION OF SUBSTANCE CONTAINED IN GAS

BACKGROUND OF THE INVENTION

1. Field of the Invention

The present invention relates to a technique for decomposing substances contained in gases.

2. Description of the Related Art

In order to purify a gas containing substances to be decomposed, such as pollutants, a technique is known in which a gas obtained by vacuum extraction of soil polluted with organic chlorine compounds is irradiated with light with a specific wavelength to cause photolysis, and the gas is thereby purified. For example, U.S. Pat. No. 6,238,628 discloses a photolytic process by irradiation with ultraviolet light at a wavelength of 185 nm or 254 nm in order to purify a gas containing organic solvents, such as trichloroethylene, 1,1,1-trichloroethane, tetrachloroethylene, cis-1,2-dichloroethylene, and chlorofluorocarbons.

A method is also widely used in which a gas containing pollutants is brought into contact with an adsorbent, such as activated carbon, and the pollutants are adsorbed in the adsorbent for separation, and a purified gas is thereby obtained.

The adsorbent which has adsorbed pollutants may be incinerated as it is. In some cases, the pollutants are desorbed from the adsorbent using steam or the like for recovery, and the resultant solution is discharged out of the system to complete the treatment, as disclosed in Japanese Patent Publication No. 8-15529 or Japanese Patent Laid-Open No. 5-131113.

Currently, there is a demand for a decomposition technique for decomposing a substance to be decomposed with high efficiency.

SUMMARY OF THE INVENTION

It is an object of the present invention to provide a decomposition apparatus and a decomposition method in which a substance to be decomposed is decomposed with high efficiency.

In one aspect of the present invention, a decomposition apparatus for decomposing a substance to be decomposed includes condensation means for increasing the concentration of the substance, and decomposition means including a decomposition chamber for receiving and decomposing the substance of which concentration is increased by the condensation means. The substance of which concentration is increased by the condensation means, in a gaseous state, is directly transported to the decomposition chamber and is decomposed.

In another aspect of the present invention, a method for decomposing a substance to be decomposed includes a condensation step of increasing the concentration of the substance, and a decomposition step of decomposing the substance of which concentration is increased in the condensation step in a predetermined space. The substance of which concentration is increased in the condensation step, in a gaseous state, is directly transported to the predetermined space and is decomposed in the decomposition step.

Further objects, features and advantages of the present invention will become apparent from the following description of the preferred embodiments with reference to the attached drawings.

DESCRIPTION OF THE PREFERRED EMBODIMENTS

Steps in a decomposition method and a decomposition apparatus used in the method in accordance with the present invention will be described below.

In the present invention, a gas containing a substance, such as a pollutant, to be decomposed is fed into an apparatus at a predetermined flow rate. The gas fed into the apparatus is brought into contact with an adsorbent provided in the apparatus, and the pollutant is adsorbed in the adsorbent and is condensed by the adsorbent. The gas passed through the adsorbent is a purified gas. The decomposition apparatus of the present invention includes at least condensation means and decomposition means. In such a case, the condensation means is provided with the adsorbent. The flow rate of the gas fed into the apparatus (condensation means) during absorption is preferably 0.1 to 100 $m^3$/min. By passing, for example, a heated gas through the adsorbent in which the pollutant has been adsorbed, the pollutant is desorbed from the adsorbent and is released, in a gaseous state, into a vapor phase. At this stage, the flow rate of the gas per unit time during releasing, i.e., the flow rate of the heated gas fed into the apparatus (condensation means), is preferably smaller than the flow rate of the polluted gas per unit time during adsorption so that the concentration factor of the pollutant during releasing is 2 to 100.

The heated gas is, for example, heated air. By passing the heated gas through the adsorbent, the substance to be decomposed can be easily removed from the condensation means at a small flow rate. In the present invention, the apparatus is designed so that a substance, such as a pollutant, to be decomposed, is condensed by the condensation means, and the substance is then released (desorbed) from the condensation means at a higher concentration than that of the substance in the gas before condensation. The substance to be decomposed is in a gaseous state (gas), and is decomposed in a gaseous state by the decomposition means.

Since the condensed substance is released (desorbed) from the condensation means, the condensation means can be reused. Since the substance to be decomposed is condensed, decomposition can be performed efficiently. More specifically, after being released from the adsorbent which is the condensation means, the condensed gas containing the pollutant is transported to a reaction vessel (decomposition chamber) constituting the decomposition means.

In order to decompose the substance to be decomposed, preferably, the substance is irradiated with light. When the condensed gas is irradiated with light from light irradiation means in a reaction zone (decomposition chamber), the pollutant in the condensed gas is sequentially decomposed. The gas of which pollutant has been decomposed flows through an exhaust pipe, which is exhaust means, to the outside of the apparatus. By desorbing the pollutant, which is the sorbate, from the adsorbent in such a manner, the adsorbent is regenerated and the condensed pollutant is decomposed.

Figure 4:
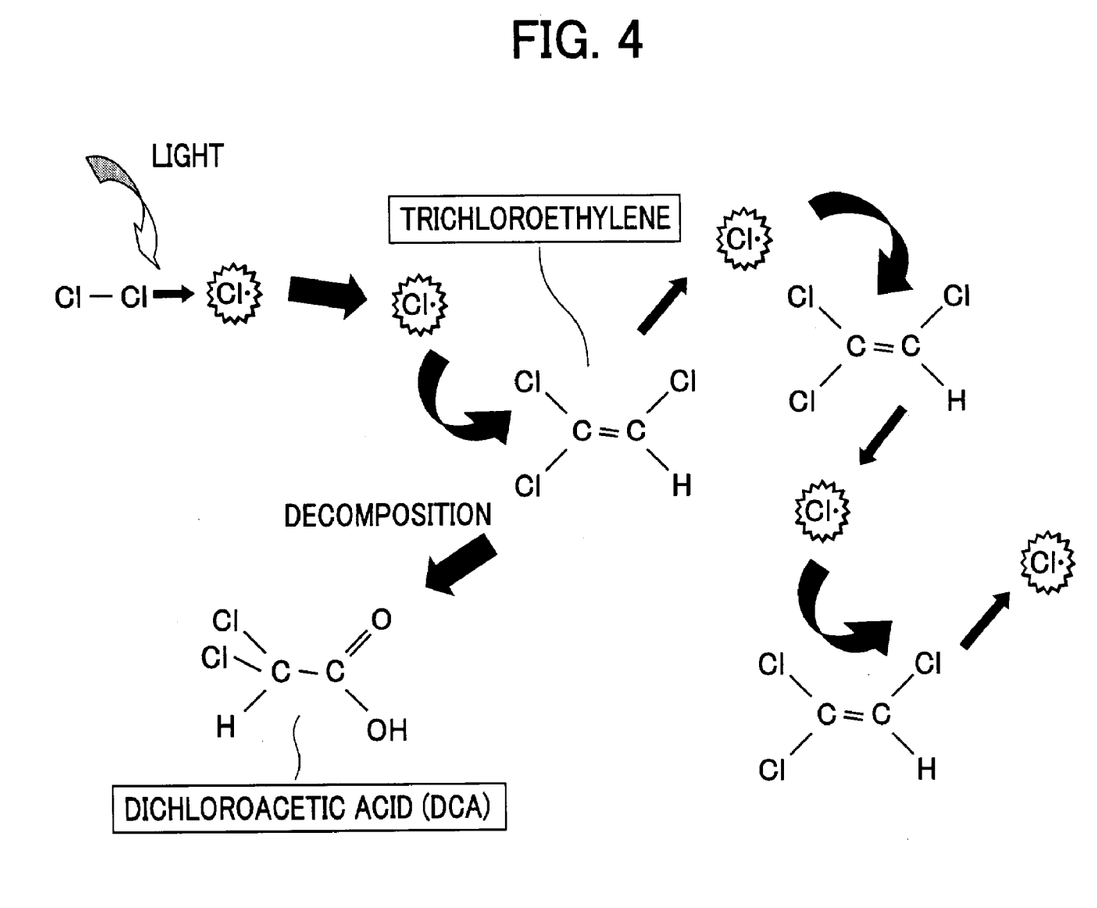
FIG. 4 is a schematic diagram which shows a mechanism in which a pollutant is decomposed by light irradiation.

A mechanism in which a pollutant is decomposed by light irradiation will now be described in detail with reference to FIG. 4 and reaction formulae (1) to (6) below. As an example of the substance to be decomposed, trichloroethylene is taken.

The mechanism in which the pollutant is decomposed by light irradiation is expressed as follows.

$Cl_2 + h\nu \text{ (light)} \rightarrow 2Cl\cdot$ (1)

$Cl\cdot + HClC=CCl_2 \rightarrow HCl_2C-CCl_2\cdot$ (2)

$O_2 + HCl_2C-CCl_2\cdot \rightarrow HCl_2C-CCl_2OO\cdot$ (3)

$2HCl_2C-CCl_2OO\cdot \rightarrow 2HCl_2C-CCl_2O\cdot + O_2$ (4)

(5) $HCl_2C-CCl_2O\cdot \longrightarrow Cl\cdot + HCl_2C-C(O)Cl$ (2) Chain Reaction Loop $HCl_2C-C(O)Cl + H_2O \rightarrow HCl + HCl_2C-COOH$ (6)

A chlorine radical (Cl·) is generated by light irradiation. The chlorine radical attacks trichloroethylene, which is a substance to be decomposed, and trichloroethylene is broken down to dichloroacetic acid. At this stage, chlorine from trichloroethylene also produces a free radical, which is used for decomposition of other trichloroethylene molecules. In this way, a chain reaction occurs, and a large amount of the substance to be decomposed is decomposed by a small amount of chlorine. In general, chemical reactivity increases in vapor phase reactions, and in particular, in such a chain reaction, this tendency is conspicuous.

Figure 5:
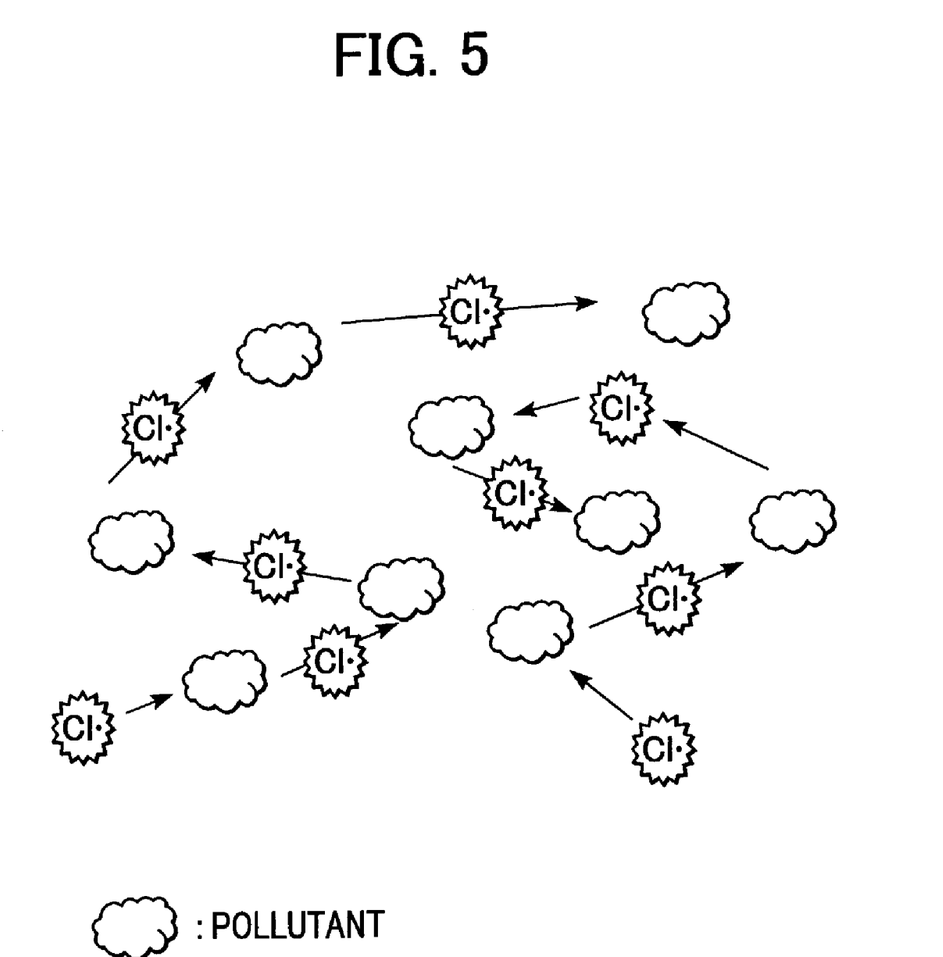
FIG. 5 is a schematic diagram which shows the decomposition of a pollutant by chlorine radicals in a region with a high pollutant concentration.
Figure 6:
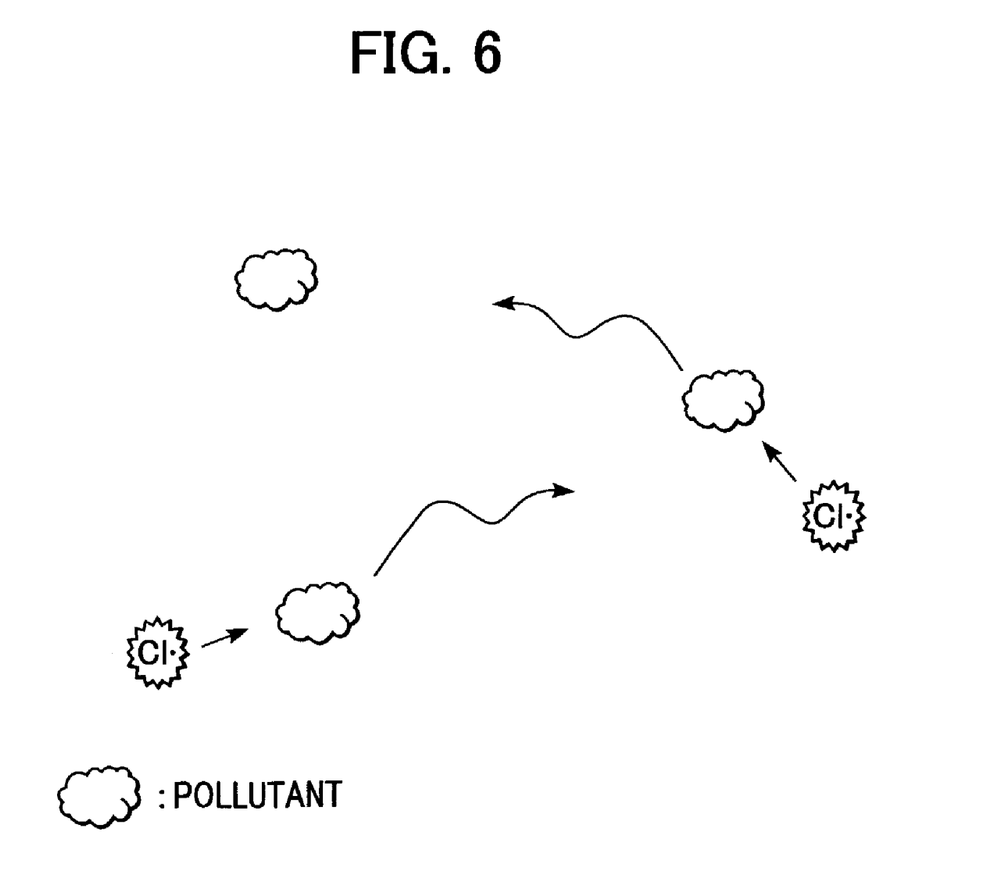
FIG. 6 is a schematic diagram which shows the decomposition of a pollutant by chlorine radicals in a region with a low pollutant concentration.

FIGS. 5 and 6 are schematic diagrams which show the states in which chlorine radicals attack a high-concentration pollutant and a low-concentration pollutant, respectively. FIG. 5 is a schematic diagram which shows the decomposition of the pollutant by chlorine radicals in a region with a high pollutant concentration. FIG. 6 is a schematic diagram which shows the decomposition of a pollutant by chlorine radicals in a region with a low pollutant concentration. As shown in FIGS. 5 and 6, as the concentration of the pollutant is increased, the probability of collision between the pollutant and chlorine, that is, the probability of chlorine radicals encountering the pollutant during their lifetime, increases. Therefore, as the concentration of the pollutant is increased, the decomposition efficiency is increased. That is, in the case in which a chlorine radical generated from a pollutant molecule during the decomposition of the pollutant molecule is used for the decomposition of another pollutant molecule, since the chlorine radical generated from the pollutant molecule also acts as a factor for decomposition, the high concentration of the pollutant in a space where decomposition is performed means a large number of chlorine radicals. As the concentration of the pollutant is increased, decomposition is accelerated.

The chlorine radicals used in the decomposition described above can be obtained by irradiating chlorine with light. Chlorine may be supplied from outside, or chlorine generated by the decomposition of the substance due to light irradiation or the like may be used. That is, in the present invention, the supply of a chlorine gas (Cl$_2$) is not essential at least during decomposition. In particular, when the substances to be decomposed are molecules containing chlorine, such as trichloroethylene, it may be possible to use the phenomenon in which intramolecular chlorine is split into chlorine radicals. If a chlorine gas is fed at least during decomposition, chlorine radicals are easily generated, which is desirable.

U.S. Pat. No. 6,444,015 discloses a technique of adsorbing a waste gas containing an organic solvent in activated carbon. The organic solvent adsorbed in the activated carbon is desorbed from the activated carbon by steam. The organic solvent is incorporated into the steam, and consequently, is condensed in a solution and transported to a reaction vessel. The organic solvent which is vaporized from the solution in the reaction vessel can have a higher concentration than that of the organic solvent contained in the waste gas. Light irradiation means decomposes the organic solvent vaporized from the solution in the reaction vessel.

In contrast, in the present invention, the substance to be decomposed which has been desorbed from the adsorption means is maintained in a gaseous state until the substance is decomposed by the decomposition means. Of course, the heated gas used in the present invention is not a heated gas, such as steam, which is liquefied by cooling in large amounts. In the present invention, it is not necessary to store a solution in which the substance to be decomposed is condensed, and it is also not necessary to vaporize the substance to be decomposed from the solution in which the substance is condensed.

The embodiments of the present invention will now be described with reference to the drawings.

First Embodiment

Figure 1:
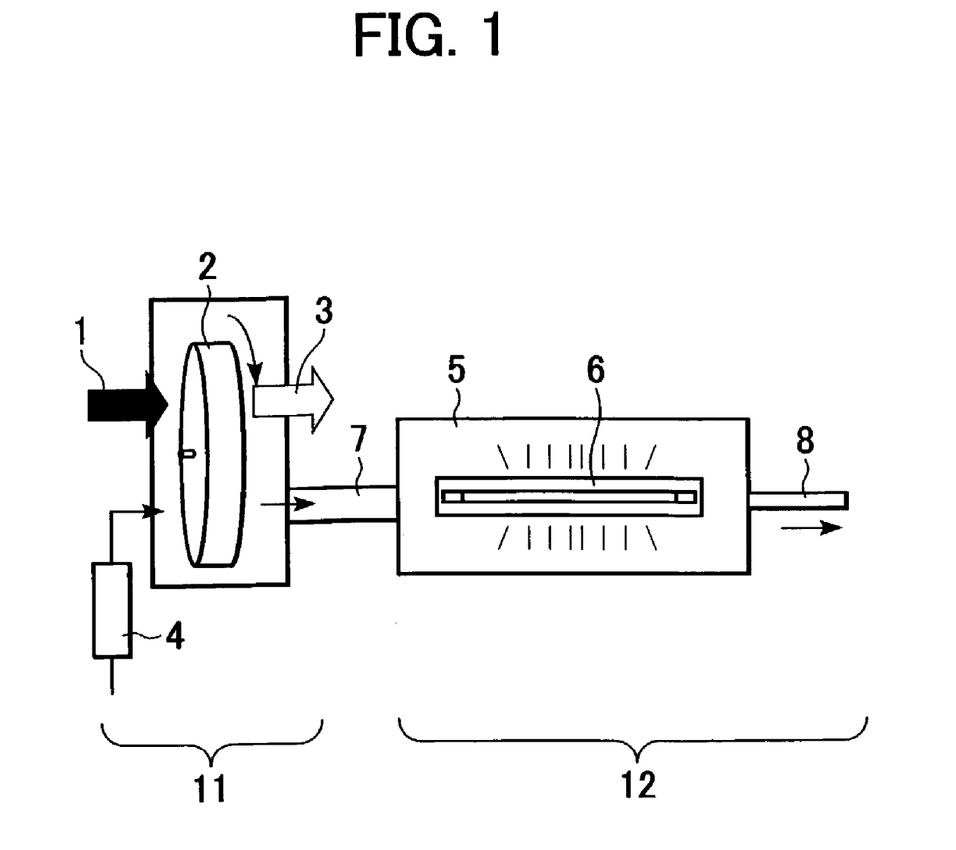
FIG. 1 is a schematic diagram of a decomposition apparatus in a first embodiment of the present invention.

In a first embodiment of the present invention, a decomposition apparatus includes condensation means and decomposition means. FIG. 1 is a schematic diagram showing a decomposition apparatus in the first embodiment of the present invention. That is, the schematic diagram shows a system in which a pollutant, which is a substance to be decomposed, is adsorbed from a gas in an adsorbent constituting the condensation means, and the gas is thereby purified, and in which the pollutant is desorbed from the adsorbent and the desorbed pollutant is decomposed by the decomposition means.

The system includes a condensing unit 11 (condensation means) for condensing a gas 1 to be treated and a photolytic unit 12 (decomposition means) for photolyzing the condensed gas. Furthermore, the condensing unit 11 includes an adsorbent 2 in which the pollutant is adsorbed and from which the pollutant is desorbed, and desorption means 4. The adsorbent 2 has a region in which the pollutant is adsorbed in the adsorbent 2 to obtain a purified gas 3, and a region in which the pollutant is desorbed from the adsorbent 2 by heat or the like to obtain a condensed gas. As the desorption means 4, for example, means for supplying heated air is used. The condensing unit 11 and the photolytic unit 12 are connected to each other by a pipe 7 for feeding the condensed gas into the photolytic unit 12. The diameter and length of the pipe 7 may be set appropriately. By increasing the length of the pipe 7, it is possible to dissipate heat from the condensed gas during transportation through the pipe 7. Alternatively, cooling means which will be described below may be provided to cool the gas during transportation through the pipe 7. If dissipation of heat from the condensed gas must be avoided, a heat insulator or heating means may be provided on the pipe 7. Alternatively, the length of the pipe 7 may be decreased. In this embodiment, as shown in FIG. 1, the pipe 7 may be provided at the position which is opposed, with the absorbent therebetween, to the position at which the heated gas is supplied to the absorbent. In such a construction, the condensed gas can be led to the pipe 7 efficiently. If dust or the like is generated from the absorbent, a dust filter may be placed in the space in which the adsorbent 2 is placed or in the pipe 7. Alternatively, the shape of the pipe may be changed so that the dust is prevented from being conveyed to the decomposition means.

In a photoreaction vessel 5 of the photolytic unit 12 which is the decomposition means, light irradiation means 6 is placed. In this embodiment, as shown in FIG. 1, the light irradiation means 6 is rod-shaped, and the reaction vessel 5 extends in the longitudinal direction of the light irradiation means 6. In such a construction, the condensed gas passes along the light irradiation means 6 from one end to the other end so that the condensed gas is effectively exposed to light emitted from the light irradiation means 6. In this embodiment, as shown in FIG. 1, one end of the light irradiation means 6 faces the position at which the pipe 7 is connected. In such a construction, the condensed gas transported through the pipe 7 and fed into the reaction vessel 5 flows around the light irradiation means 6 efficiently. Although the light irradiation means 6 is placed in the reaction vessel 5 in this embodiment, the light irradiation means 6 may be placed outside the reaction vessel 5 provided with a light-transmissive wall. Although one light irradiation means 6 is provided in the apparatus shown in FIG. 1, a plurality of light irradiation means may be used. An exhaust pipe 8 may be placed at any position of the reaction vessel 5. In this embodiment, the exhaust pipe 8 is placed opposite to the other end of the light irradiation means 6.

In the decomposition system with such a construction, the gas 1 is brought into contact with the adsorbent 2 in the adsorption zone, the pollutant in the gas is adsorbed in the adsorbent 2, and the purified gas 3 is discharged. The adsorbent 2 is annularly set up, and the rotor-shape adsorbent 2 rotates at a predetermined speed. The adsorbent 2 passes through the adsorption zone and the desorption zone alternately. That is, a portion of the adsorbent 2 in which the pollutant has been adsorbed moves from the adsorption zone to the desorption zone, and treatment is thereby continuously performed.

By feeding a heated gas from the means 4 for supplying heated gas into the desorption zone, the sorbate is desorbed from the adsorbent 2 into a vapor phase, and the desorption zone of the adsorbent 2 is regenerated. Simultaneously, a gas containing the pollutant is obtained. By setting the amount of the heated gas fed into the desorption zone, the rotational speed of the adsorbent 2, etc., at predetermined values, it is possible to increase the concentration of the pollutant contained in the desorbed gas compared to the concentration of the pollutant contained in the gas 1. Herein, the amount of the heated gas fed into the desorption zone is set so that the concentration factor of the pollutant is 2 to 100. For example, in order to set the concentration of the pollutant to be two times that of the pollutant contained in the gas 1 at a gas flow rate of 0.1 $m^3$/min, the heated gas is fed into the desorption zone at half of the gas flow rate, i.e., 0.05 $m^3$/min.

For example, in order to set the concentration factor of the pollutant at 20 to 30, the rotational speed of the adsorbent 2 is set at 10 to 20 rph (revolutions per hour).

The condensing system may be newly manufactured or a commercially available condensing system may be used. For example, Admat (trade name) manufactured by Taikisha Ltd. may be used. The Admat system adsorbs and condenses solvent gases. As the adsorption element, felt-like activated carbon fiber mats are employed. These mats are wound around cylindrical mesh and rotated slowly to continuously adsorb and desorb the pollutant. During adsorption, an untreated gas is passed through from the outside to the inside of the mats, and during desorption, hot air at approximately 130° C. is passed through from the inside to the outside of the mats.

The gas containing the condensed pollutant is fed into the reaction vessel 5, and the condensed gas is irradiated with light by a lamp which is the light irradiation means 6 in the reaction zone. The pollutant is photolyzed and the treated gas after photolysis is discharged through the exhaust pipe 8.

The present invention will be described in detail with reference to an example in which a gas with a pollutant concentration of approximately 10 ppmV and a flow rate of 20 $m^3$/min is treated using the decomposition apparatus of the present invention.

When the above-mentioned gas is adsorbed in the adsorbent 2 in the adsorption zone and then heated by a heated gas at 1 $m^3$/min to desorb the pollutant in the desorption zone, a condensed gas with a pollutant concentration of 200 ppmV is obtained in accordance with the equation below.

$$10 \text{ ppmV} \times 20 \text{ m}^3/\text{min}/1 \text{ m}^3/\text{min} = 200 \text{ ppmV}$$

The condensed gas is decomposed in the photoreaction vessel.

In Case 1 in which no condensation is performed, 10 ppmV of the pollutant must be fed into the photoreaction vessel at 20 $m^3$/min for decomposition. In Case 2 in which condensation is performed in accordance with the present invention, since 10 ppmV of the pollutant fed at 20 $m^3$/min is condensed to 200 ppmV, the flow rate of the pollutant flowing into the photoreaction vessel is 1 $m^3$/min. In general, the efficiency of a chemical reaction increases as the concentration is increased, and in particular, in the photolysis of organic chlorine compounds, a chain reaction is considered to be initiated by chlorine radicals, and this tendency is intensified. Consequently, even if the pollutant concentration increases 20-fold, the time required for decomposition (reaction time) does not increase 20-fold in a direct proportion. In actual testing, it has been found that when the concentration increases 20-fold, the reaction time can be estimated to increase 2-fold at the most. Therefore, if the reaction time is 1 minute in Case 1, decomposition can be completed in 2 minutes in Case 2. In Case 1, the reaction vessel requires the capacity so as to allow a reaction time, i.e., residence time, of 1 minute, which corresponds to 20 $m^3$. In contrast, in Case 2, since the condensed gas at 1 $m^3$/min is treated over 2 minutes, the required capacity of the reaction vessel is only 2 $m^3$.

As described above, by incorporating the condensing step prior to decomposition, the decomposition rate is increased by condensation, and the decomposition efficiency is improved. Since the size of the reaction vessel can be extremely decreased, the space for the apparatus can be reduced, resulting in a decrease in equipment and running costs.

Second Embodiment

Figure 2:
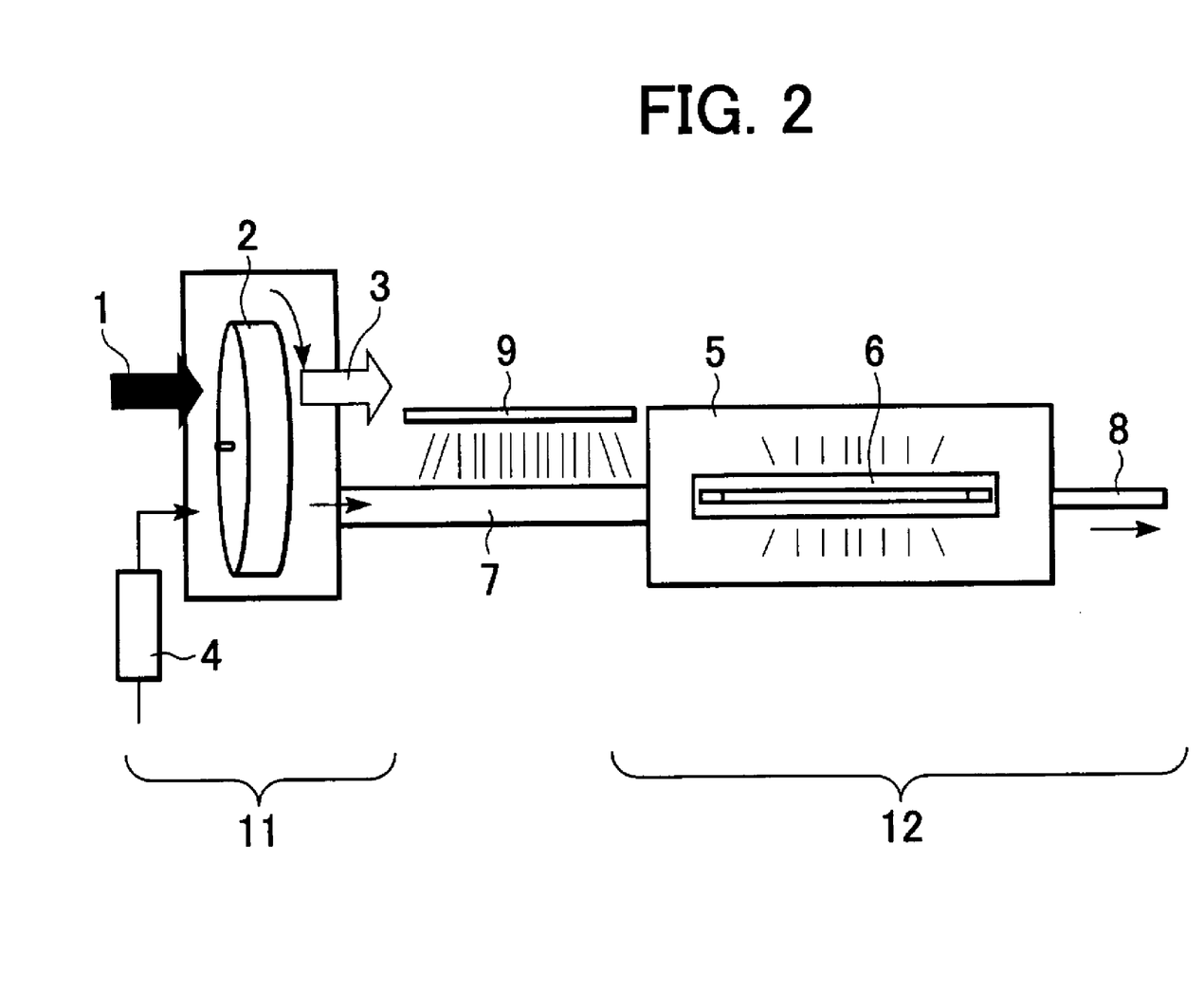
FIG. 2 is a schematic diagram of a decomposition apparatus in a second embodiment of the present invention.

A decomposition apparatus in a second embodiment of the present invention has the same structure as that in the first embodiment except that means for decreasing the temperature of a substance to be decomposed is provided between the condensation means and the decomposition means. FIG. 2 is a schematic diagram showing the decomposition apparatus in this embodiment. In FIG. 2, the same reference numerals are used as those in FIG. 1 for the same elements. In FIG. 2, cooling means 9 is provided between the condensation means 11 and the reaction vessel 5.

In order to condense a gas, the gas is adsorbed in an adsorbent first and then, in many cases, a condensed gas is obtained by heating. Before the condensed gas is fed into the photoreaction vessel, preferably, the temperature of the condensed gas is decreased. The coefficient of volumetric expansion of a gas at low temperature is smaller than that at high temperature, and at low temperature, originally intended condensation is performed more successfully. The concentration of the pollutant fed into the photoreaction vessel is thereby considered to be increased. As described above, in the reaction used in this embodiment, since the decomposition efficiency increases as the concentration of the pollutant increases, the concentration of the pollutant must be increased. Therefore, by cooling the gas to reduce the volume, the concentration of the pollutant is increased, which results in condensation. Cooling is performed in order to obtain a gas with a higher pollutant concentration, and preferably, the polluted gas is not liquefied by cooling.

Since the radical reaction is used in this embodiment, the reactivity is not considered to be decreased by a decrease in temperature. Further improvement in the decomposition efficiency is expected by more efficient condensation of the pollutant. In this respect, cooling is effective not only in the construction in which a condensed gas is obtained from the adsorbent by heating but also in other constructions, such as the one in which a condensed gas is obtained by pressure.

Any cooling means is acceptable in the present invention. For example, heat may be dissipated by the pipe 7 and a material for accelerating the heat dissipation may be selected appropriately. More actively, the pipe 7 between the condensing unit and the reactor vessel may be cooled by cooling means 9, such as water cooling or air cooling. In this embodiment, the pipe 7 is showered with water by the cooling means 9.

Third Embodiment

Figure 3:
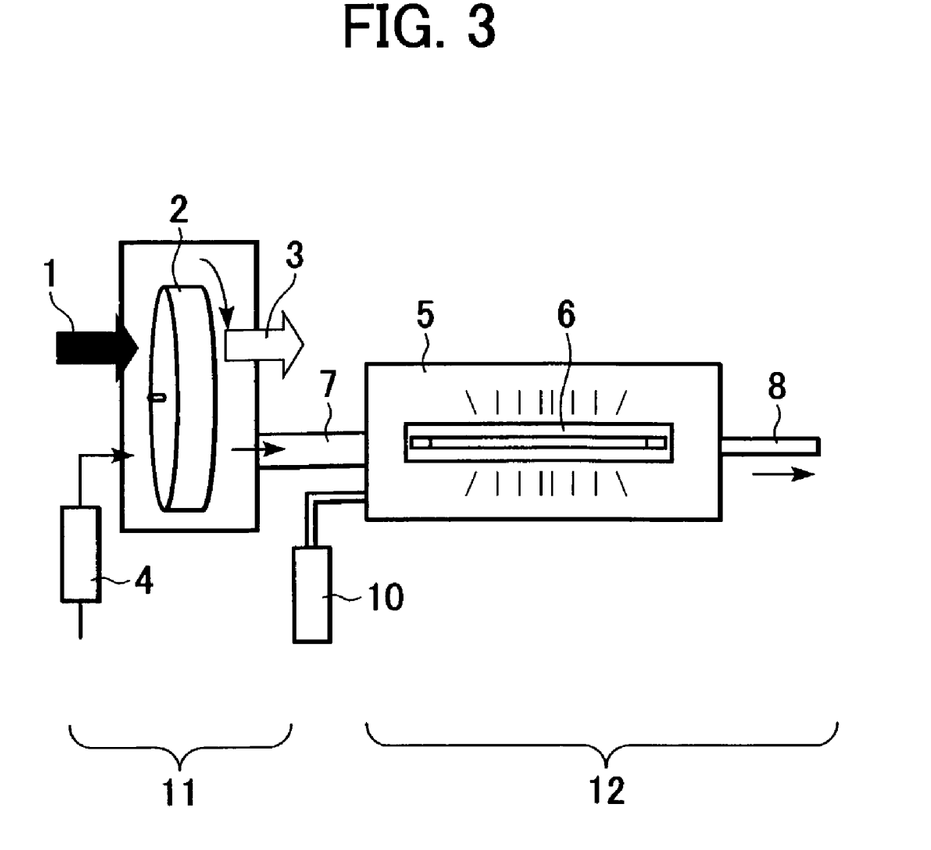
FIG. 3 is a schematic diagram of a decomposition apparatus in a third embodiment of the present invention.

A decomposition apparatus in a third embodiment of the present invention has the same structure as that in the first embodiment except that means for supplying a material for accelerating decomposition to the decomposition means is provided. FIG. 3 is a schematic diagram showing the decomposition apparatus in this embodiment. In FIG. 3, an example in which photolysis is accelerated in the presence of chlorine is shown. In FIG. 3, the same reference numerals are used as those in FIGS. 1 and 2 for the same elements. In FIG. 3, chlorine supply means 10 is provided on the reaction vessel 5.

Chlorine is mixed into a condensed gas containing a pollutant by the chlorine supply means 10, and decomposition is performed by irradiating the mixed gas with light. In photolysis in the presence of chlorine, ultraviolet light with a wavelength of 254 nm or 185 nm is not required. For example, decomposition sufficient for practical use is performed by light with a wavelength of 315 to 500 nm. As the light source for such light, natural light (e.g., sunlight) or artificial light (e.g., mercury lamp, black light, or color fluorescent lamp) may be used. In the present invention, photolysis with light containing UV-A (315 to 400 nm) is more preferable compared to photolysis with light containing UV-B and C (100 to 315 nm). That is, although UV-B and C having higher light energy are considered to be effective in decomposition because they can break various bondings of pollutants, in the case in which other inclusions are involved, various by-products may be generated. When the concentration of the pollutant is low, the amounts of such by-products are insignificant. However, when a condensed polluted gas is decomposed as in the case of the present invention, the influence of such by-products must be taken into consideration.

In FIG. 3, reference numeral 10 represents a cylinder of the chlorine supply means, and as the light irradiation means 6, a black light fluorescent lamp is used. As the chlorine supply means 10, means in which chlorine gas discharged from a container filled with chlorine, such as a chlorine cylinder, is mixed with air to obtain air containing chlorine and/or means in which air is brought into contact with water containing chlorine to obtain air containing chlorine is preferably used.

The individual elements will now be described in detail.

Adsorbent

Any adsorbent may be used for the system of the present invention described above. Preferably, a solid adsorbent with a porous surface is used. Examples thereof include activated carbon which is generally used for adsorbing hydrocarbon compounds and which is obtained by carbonizing cellulosic substances, such as wood, or chitinous substances; activated carbon fibers; porous metals obtained by firing fine powders of zeolite, silica gel, iron, alumina, or the like; and activated clay which is also used for adsorbing oil or as a deodorant. Above all, activated carbon is generally used. For example, activated carbon with a specific surface area of 300 to 3,000 $m^2/g$ and a pore diameter of approximately 30 to 3,300 angstroms is said to adsorb trichloroethylene in the vapor phase in the amount approximately ten times its own weight. At present, various activated carbon fibers have been developed. Activated carbon sheets are produced by forming these activated carbon fibers into fabrics or non-woven fabrics, and activated carbon cartridges are also available.

The rotor-shaped system used in the condensing unit has been described above, in which the adsorbent passes through the adsorption zone for the adsorption step and the desorption zone for the regeneration step alternately.

Other types of adsorbent elements may also be used. For example, two containers holding an adsorbent are prepared so that an original gas containing a substance to be decomposed is adsorbed in one container, and the adsorbent is regenerated and a condensed gas is obtained in the other container. These steps are performed alternately. That is, while one of the adsorbents removes the pollutant from the original gas, the other adsorbent regenerates activated carbon and obtains the condensed gas.

The condensation means in which the steps are alternately performed as described above or a so-called "carousel type" in which a plurality of containers holding an adsorbent are sequentially employed may be used in the present invention. That is, in the carousel-type system which includes, for example, activated carbon towers A, B, and C, when the tower A performs adsorption, the tower B performs desorption (regeneration) and the tower C is in an inactive state. In the next step, when the tower C performs adsorption, the tower A performs desorption (regeneration) and the tower B is in an inactive state. Furthermore, when the tower B performs adsorption, the tower C performs desorption (regeneration) and the tower A is in an inactive state. By repeating the steps in such a manner, condensation is carried out continuously.

In the rotor-type system, the system in which the steps are alternately performed, or the carousel-type system, adsorption and desorption (regeneration) are performed simultaneously. Consequently, in such systems, it is possible to continuously perform the process including feed of a gas to be treated, condensation, transportation to the decomposition chamber, and decomposition. That is, a continuous decomposition system is established in which a substance to be decomposed that is continuously fed into the system within unit time is continuously decomposed within unit time.

Substance to be Treated

The substance to be treated is a substance that can be decomposed by light irradiation. In particular, organic chlorine compounds are preferred, and examples thereof include chloroethylene, dichloroethylene, trichloroethylene, tetrachloroethylene, chloromethane, dichloromethane, chloroform, 1,1,1-trichloroethane, and chlorobenzene, which are decomposed by chain reactions by chlorine.

Any pollutant containing organic chlorine compounds to be decomposed may be treated. The present invention can be applied in order to purify waste water and waste gases from plants, such as paint plants and dry cleaning plants, and soil and groundwater polluted with such pollutants. For example, the present invention is applied in order to remove pollutants contained in gases generated during air stripping and gases obtained by vacuum extraction of polluted soil. Air stripping is the process of injecting air or the like into an aqueous phase to move volatile pollutants from the aqueous phase to a vapor phase for removal. The difference between air stripping and aeration will be described below with respect to the present invention. Air stripping intends to remove (strip) a substance from a solution. On the other hand, aeration means exposure to a gas and intends to bring a liquid and a gas into contact with each other. As a result, a substance may move from the liquid into the vapor phase or a substance in the gas may move into the liquid phase.

Removal Means

In order to remove the sorbate from the adsorbent, any means may be used. Heating means or pressure means is mainly used.

As the adsorbent heating means, microwave heating or heating by a heater may be used, which is selected according to the combination with the adsorbent. The surface temperature is, for example, approximately 120° C. Although a higher temperature than this may be required depending on the substance to be decomposed, the temperature must be determined in consideration of the ignition of the mixed substances.

As the removal means by pressure, an apparatus and technology of pressure swing adsorption (PSA) may be used. PSA is a dry gas separation method in which a component which is easily adsorbed is adsorbed in an adsorbent under high pressure to retrieve a component which is slightly adsorbed, and the component which is easily adsorbed is desorbed and recovered under low pressure for regeneration.

Reaction Vessel

Any vessel which physically delimits a region for decomposition treatment may be used. As described above, in the case in which a purification reaction is caused by light with a wavelength not less than 300 nm, it is not necessary to use a vessel composed of expensive quartz glass or a material in which ultraviolet transmission is improved using a special additive, and it is possible to use a vessel composed of common glass, plastic, or the like which transmits visible light with a wavelength of 300 nm or more. Consequently, an inexpensive system can be achieved compared to the apparatus in which ultraviolet irradiation is required.

Since the material can be selected from a wider range, freedom of selection in construction and shape of the reaction vessel is increased. For example, a bag-like vessel, such as an air bag, may be used. The bag-like vessel may be composed of any material as long as it transmits light required for decomposition (with a wavelength of 300 nm or more, or 350 nm or more). Preferably, a bag composed of a polyvinyl fluoride film, such as Tedlar (trade name) manufactured by DuPont Corp., a fluorocarbon resin, or the like is used in view of adsorptivity and permeability of gases. By using a bag as the reaction vessel, the apparatus can be produced inexpensively, and because of its light weight, the apparatus can be easily installed in and moved from the treatment site. If the vessel has a bellows structure, folding can be easily performed. With respect to the bellows structure and the bag-like vessel, the size of the reaction vessel can be easily changed in accordance with the decomposition conditions, and optimum residence time (reaction time) can be variably set depending on the situation.

The present invention will be described in more details based on the examples.

EXAMPLE 1

In this example, using an apparatus shown in FIG. 1, the present invention was experimentally confirmed.

A polluted gas was obtained by vacuum extraction of soil polluted with organic chlorine compounds, and a gas 1 which is the polluted gas was fed into a condensing unit 11 at 20 m³/min. The trichloroethylene concentration was approximately 40 to 60 ppmV, and the tetrachloroethylene concentration was approximately 50 to 70 ppmV.

As the condensing unit, Admat ADC-8(S) (trade name) manufactured by Taikisha Ltd. was employed, and operated by setting the concentration factor at 20. As a result, the condensed gas from the Admat system had a trichloroethylene concentration of approximately 900 to 1,200 ppmV and a tetrachloroethylene concentration of approximately 1,000 to 1,400 ppmV. Each of the trichloroethylene concentration and the tetrachloroethylene concentration in the purified gas 3 was 3 ppmV or less. The flow rate of the purified gas 3 was 20 m³/min, and the flow rate of the condensed gas was approximately 1 m³/min. Desorption was performed at approximately 130° C. using air heated by an electric heater. The condensed gas was fed into the photoreaction vessel 5 through the pipe 7 at 1 m³/min. The photoreaction vessel 5 had a capacity of 1.5 m³ and the residence time was set at 90 seconds. A plurality of light irradiation means were provided inside the photoreaction vessel, and the condensed gas was irradiated with light. A commercially available fluorescent lamp with the bactericidal effect (GL30: 30 W; manufactured by Toshiba Corp.) was used for light irradiation. The fluorescent lamp was enclosed in a sheath composed of quartz.

After the operation of the apparatus was started, in order to check the concentrations of trichloroethylene and tetrachloroethylene in the exhaust gas from the photolytic unit, the exhaust gas was periodically sampled from the exhaust pipe 8 using a gas-tight syringe, and measurement was carried out with a gas chromatograph GC-14B with a flame ionization detector (FID) manufactured by Shimadzu Corporation, and a column (DB-624) manufactured by J & W Corp. All of the concentrations measured were 5 ppmV or less.

EXAMPLE 2

In this example, an apparatus shown in FIG. 2 was used.

The apparatus was substantially the same as that used in Example 1 except that cooling means 9 was provided on the pipe 7 connecting the condensing unit 11 and the photolytic unit 12 to each other. As the cooling means 9, cooling water was sprayed to the pipe 7 to cool the condensed gas. The temperature of the condensed gas was decreased from approximately 120–130° C. to approximately 50° C. The volume of the condensed gas was decreased by 15 to 20%, and the residence time (reaction time) was increased by approximately 20%.

After the operation of the apparatus was started, in order to check the concentrations of trichloroethylene and tetrachloroethylene in the exhaust gas from the photolytic unit, the exhaust gas was periodically sampled from the exhaust pipe 8 using a gas-tight syringe, and measurement was carried out with a gas chromatograph GC-14B with a flame ionization detector (FID) manufactured by Shimadzu Corporation, and a column (DB-624) manufactured by J & W Corp. All of the concentrations measured were 1 ppmV or less.

By decreasing the temperature of the condensed gas, it was not necessary to use a heat-resistant material for the reaction vessel, enabling a reduction in equipment cost.

EXAMPLE 3

In this example, an apparatus shown in FIG. 3 was used.

In Example 3, chlorine was used for decomposing the pollutant in photolysis. That is, except that chlorine was supplied to the photoreaction vessel 5 from the chlorine supply means 10 and a mixed gas of chlorine and the condensed gas was irradiated with light, decomposition was performed substantially in the same manner as that in Example 1.

Chlorine was supplied so that the chlorine concentration was approximately 100 ppmV in the reaction vessel 5. A commercially available black light fluorescent lamp (FL40S BLB: 40 W; manufactured by Toshiba Corp.) was used for light irradiation. The fluorescent lamp was enclosed in a sheath composed of glass.

After the operation of the apparatus was started, in order to check the concentrations of trichloroethylene and tetrachloroethylene in the exhaust gas from the photolytic unit, the exhaust gas was periodically sampled from the exhaust pipe 8 using a gas-tight syringe, and measurement was carried out with a gas chromatograph GC-14B with a flame ionization detector (FID) manufactured by Shimadzu Corporation, and a column (DB-624) manufactured by J & W Corp. All of the concentrations measured were 5 ppmV or less.

As is obvious from the embodiments and examples described above, in accordance with the present invention, it is possible to increase the decomposition efficiency for a substance to be decomposed. Furthermore, in accordance with the present invention, it is possible to reduce the size of the apparatus, enabling a decrease in equipment and running costs.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A decomposition apparatus for decomposing a substance to be decomposed comprising:
    condensation means comprising for producing a condensed gaseous substance:
        an adsorbent for adsorbing the substance, and
        a supplier for supplying to the absorbent a heated gas, which is used to produce the condensed gaseous substance;
    a cooler for cooling the condensed gaseous substance; and
    decomposition means comprising:
        a chamber for receiving the cooled condensed gaseous substance; and
        a light irradiator for irradiating the cooled condensed gaseous substance.

2. A decomposition apparatus according to claim 1, wherein the chamber is adapted to contain a material which accelerates the decomposition of the substance.

3. A decomposition apparatus according to claim 2, wherein the material is a decomposition product produced by the decomposition of the substance.

4. A decomposition apparatus according to claim 1, wherein the light has a wavelength of 300 nm or more.

5. A decomposition apparatus according to claim 1, wherein the substance is decomposed in the presence of chlorine.

6. A decomposition apparatus according to claim 1, wherein the adsorbent adsorbs the substance by coming into contact with a gas containing the substance, the adsorbent releases the adsorbed substance by coming into contact with the heated gas, and the flow rate of the gas containing the substance per unit time during the adsorption is larger than the flow rate of the heated gas per unit time during the release.

7. A decomposition apparatus according to claim 1, wherein the substance is an organic chlorine compound.

8. A decomposition apparatus according to claim 7, wherein the organic chlorine compound is at least one compound selected from the group consisting of chloroethylene, dichloroethylene, trichloroethylene, tetrachloroethylene, chloromethane, dichloromethane, chloroform, 1,1,1-trichloroethane, and chlorobenzene.

9. A decomposition apparatus according to claim 1, wherein the cooler utilizes water as a cooling medium.

10. A decomposition apparatus according to claim 1, wherein the heated gas is heated air.

* * * * *

UNITED STATES PATENT AND TRADEMARK OFFICE
CERTIFICATE OF CORRECTION

PATENT NO. : 7,144,556 B2  Page 1 of 1
APPLICATION NO. : 10/411178
DATED : December 5, 2006
INVENTOR(S) : Kinya Kato

It is certified that error appears in the above-identified patent and that said Letters Patent is hereby corrected as shown below:

COLUMN 12

Line 19, "substance:" should read --substance comprising:--.

Signed and Sealed this

Twenty-eighth Day of August, 2007

JON W. DUDAS
*Director of the United States Patent and Trademark Office*